US012328803B2

(12) United States Patent
Song et al.

(10) Patent No.: US 12,328,803 B2
(45) Date of Patent: Jun. 10, 2025

(54) MULTIPLE POWER SUPPLY CIRCUIT FOR LED ARRAY

(71) Applicant: Lumileds LLC, San Jose, CA (US)

(72) Inventors: Zhi Hua Song, Palo Alto, CA (US); Ronald Johannes Bonne, Plainfield, IL (US)

(73) Assignee: Lumileds LLC, San Jose, CA (US)

( * ) Notice: Subject to any disclaimer, the term of this patent is extended or adjusted under 35 U.S.C. 154(b) by 232 days.

(21) Appl. No.: 18/030,744

(22) PCT Filed: Oct. 8, 2021

(86) PCT No.: PCT/US2021/054137
§ 371 (c)(1),
(2) Date: Apr. 6, 2023

(87) PCT Pub. No.: WO2022/076798
PCT Pub. Date: Apr. 14, 2022

(65) Prior Publication Data
US 2023/0422367 A1 Dec. 28, 2023

Related U.S. Application Data

(60) Provisional application No. 63/089,653, filed on Oct. 9, 2020.

(51) Int. Cl.
*H04N 5/63* (2006.01)
*G09G 3/32* (2016.01)
*H05B 45/14* (2020.01)

(52) U.S. Cl.
CPC ............... *H05B 45/14* (2020.01); *G09G 3/32* (2013.01); *G09G 2320/0693* (2013.01); *G09G 2330/021* (2013.01)

(58) Field of Classification Search
CPC .. H05B 45/14; G09G 3/32; G09G 2320/0693; G09G 2330/021; G06F 3/1446
See application file for complete search history.

(56) References Cited

U.S. PATENT DOCUMENTS 9,578,701 B1 2/2017 Logiudice et al.
2008/0122383 A1 5/2008 Katoh
(Continued)

FOREIGN PATENT DOCUMENTS

CN 116569655 8/2023
JP 2008134288 6/2008
(Continued)

OTHER PUBLICATIONS

"European Application Serial No. 21878600.2, Response filed Nov. 16, 2023 to Communication pursuant to Rules 161(1) and 162 EPC filed May 19, 2023", 7 pages.
(Continued)

*Primary Examiner* — Abdul-Samad A Adediran
(74) *Attorney, Agent, or Firm* — Schwegman, Lundberg & Woessner, P.A.

(57) ABSTRACT

A power supply system for a LED pixel array includes at least two power supplies respectively connectable to sub-arrays in a LED pixel array and providing adjustable power. A controller is connected to the at least two power supplies, with the controller able to make adjustments to the power supplied based on measured requirements of sub-arrays in the LED pixel array. In one embodiment, the LED pixel array is a microLED array.

20 Claims, 7 Drawing Sheets

(56) References Cited

U.S. PATENT DOCUMENTS

| | | | | |
|---|---|---|---|---|
| 2013/0154488 | A1 | 6/2013 | Sadwick et al. | |
| 2018/0174504 | A1 | 6/2018 | Yoneoka et al. | |
| 2020/0082503 | A1 | 3/2020 | Bonne et al. | |
| 2020/0312231 | A1 | 10/2020 | Hussell | |
| 2022/0078368 | A1 * | 3/2022 | Joo | G06F 3/1446 |

FOREIGN PATENT DOCUMENTS

| | | | |
|---|---|---|---|
| JP | 2017162805 | | 9/2017 |
| JP | 2021521616 | | 8/2021 |
| KR | 20190129007 | | 11/2019 |
| WO | WO-2022076798 | A1 | 4/2022 |

OTHER PUBLICATIONS

"Korean Application Serial No. 10-2023-7015715, Notice of Preliminary Rejection mailed Sep. 26, 2024", with English translation, 16 pages.

"European Application Serial No. 21878600.2, Extended European Search Report mailed Oct. 21, 2024", 10 pages.

"Korean Application Serial No. 10-2023-7015715, Response filed Nov. 6, 2024 to Notice of Preliminary Rejection mailed Sep. 26, 2024", with English claims, 26 pages.

"Japanese Application Serial No. 2023-521617, Final Notification of Reasons for Rejection mailed Oct. 15, 2024", with English translation, 4 pages.

"International Application Serial No. PCT/US2021/054137, International Search Report mailed Jan. 14, 2022", 2 pgs.

"International Application Serial No. PCT/US2021/054137, Written Opinion mailed Jan. 14, 2022", 5 pgs.

"Japanese Application Serial No. 2023-521617, Notification of Reasons for Rejection mailed Apr. 16, 2024", with English translation, 16 pages.

"Japanese Application Serial No. 2023-521617, Response filed Jul. 16, 2024 to Notification of Reasons for Rejection mailed Apr. 16, 2024", with English claims, 31 pages.

* cited by examiner

MULTIPLE POWER SUPPLY CIRCUIT FOR LED ARRAY

RELATED APPLICATION

This application is a U.S. National Stage Filing under 35 U.S.C. 371 from International Application No. PCT/US2021/054137, filed on Oct. 8, 2021, which claims the benefit of priority to U.S. Provisional Patent Application No. 63/089,653 titled "Multiple Power Supply Circuit for a Micro-LED Array" and filed on Oct. 9, 2020, the entire contents of both of which are hereby incorporated herein by reference in their entireties.

TECHNICAL FIELD

The present disclosure relates generally to a power supply for a monolithic or segmented light emitting diode (LED) die. The power supply can be used for general lighting or display systems based on micro-LED pixel arrays.

BACKGROUND

Use of micro-LED displays or projectors is an emerging technology in lighting and display industry. A micro-LED can contain arrays of thousands to millions of microscopic LED pixels that emit light and are individually controlled. As compared to other display technologies, micro-LEDs can have a higher brightness and better energy efficiency, making them attractive for a variety of applications, such as television display or backlight, automotive lights, or mobile phones.

SUMMARY

In some embodiments, a power supply system for a LED pixel array includes at least two power supplies respectively connectable to sub-arrays in a LED pixel array and providing adjustable power. A controller is connected to the at least two power supplies, with the controller able to make adjustments to the power supplied based on measured requirements of sub-arrays in the LED pixel array.

In some embodiments, the LED pixel array comprises a microLED pixel array.

In some embodiments, settings of the at least two power supplies are factory set.

In some embodiments, settings of the at least two power supplies are dynamically set.

In some embodiments, the at least two power supplies are buck converters.

In some embodiments, the at least two power supplies connect to a positive power supply voltage and share a common ground.

In some embodiments, the at least two power supplies are each connectable in parallel to respective sub-arrays in the LED pixel array.

In some embodiments, the microLED pixel array system includes a plurality of microLED pixels supporting independently powered sub-arrays. At least two power supplies are respectively connected to each of the sub-arrays in the plurality of microLED pixels and provide adjustable power. A controller is connected to the at least two power supplies, the controller able to adjust the power supplied based on measured requirements of sub-arrays in the plurality of microLED pixels.

In some embodiments, each pixel in the plurality of microLED pixels is independently addressable to allow on/off operation In some embodiments, a control method for an LED array includes providing a plurality of microLED pixels arranged to have at least two independently powered sub-arrays. Each LED sub-array is provided with power suitable for efficient forward voltage shift matching. Power usage can be measured for at least some of the plurality of microLED pixels and power supplied to the independently powered sub-arrays dynamically adjusted based on measured power usage.

DETAILED DESCRIPTION

In LED arrays, emitted light color or intensity of the LEDs in the array is a function of supplied LED current. Small changes in current across a die or substrate supporting micro LEDs can result in undesirable color or intensity changes. An undesirable color or intensity change is one that is not consistent with an image to be provided by the array. Additionally, conventional power supply schemes are electrically relatively inefficient due to variations in forward voltage across the micro LED array. When all pixels are parallel connected and share the same power supply, the power supply voltage is designed for the maximum forward voltage in the array. However, pixels with a lower forward voltage inevitably suffer a higher voltage drop and loss on the pixel driver, leading to lower system efficiency.

Figure 1:
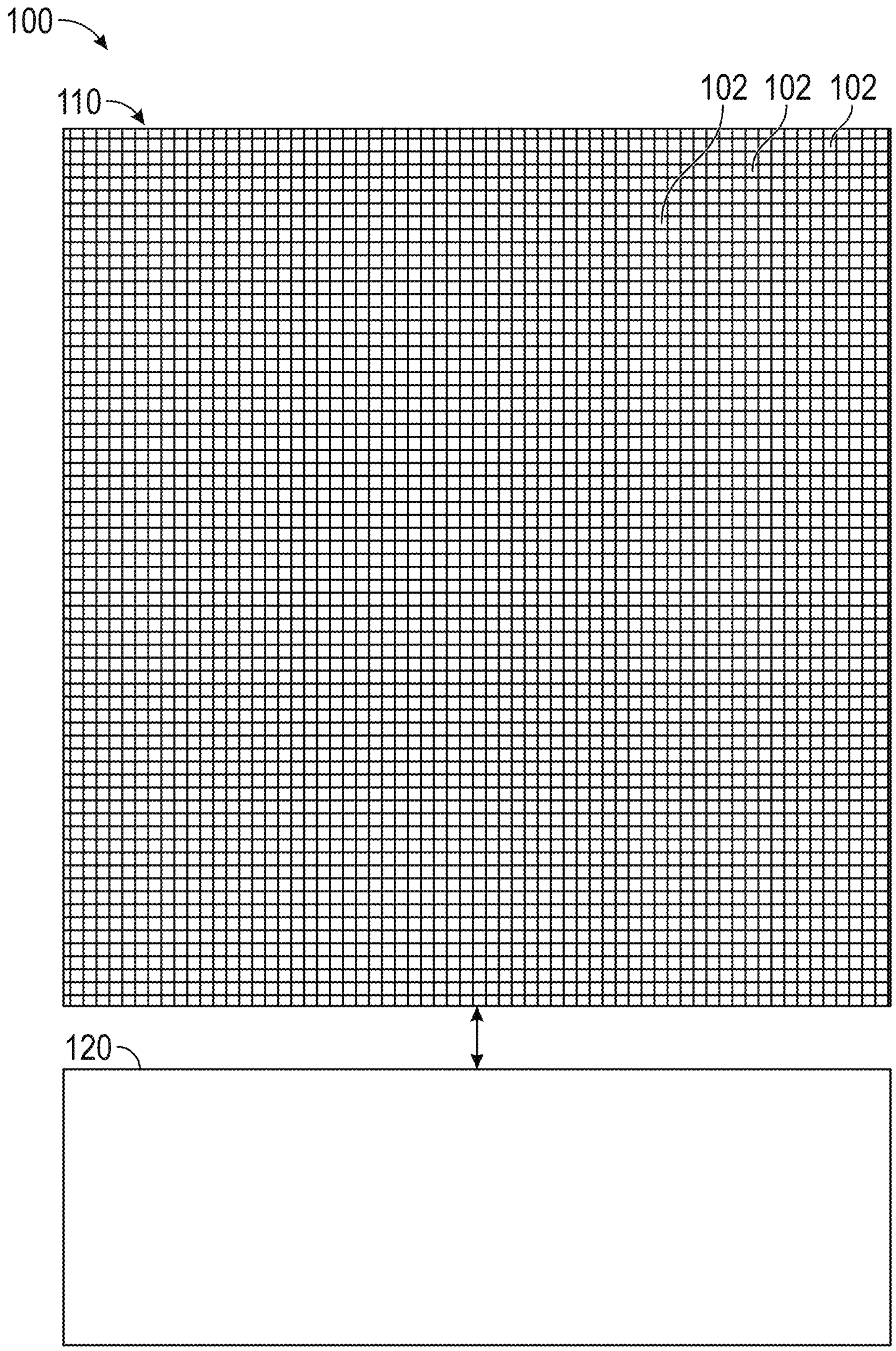
FIG. 1 illustrates an LED display system that includes an LED array that supports multiple power supplies.

FIG. 1 illustrates an LED display system 100 that includes an LED array 110. As illustrated, each box in LED array 110 defines a pixel 102 that can be controlled using a system controller 120. System controller 120 can include connection or incorporation of multiple power supplies, one or more power supply drivers, and control software. The multiple power supplies, one or more power supply drivers, and control software allow measurement and control of electrical current, and voltage provided by multiple power supplies to the LED array 110. Control can be dynamically adjusted after deployment or set during calibration. Using the system controller 120, adjustments to power provided to the LED array 110 can allow for varying pixel intensity, color, and on/off state for individual pixels or selected groups of pixels.

In some embodiments, the LED array 110 can be formed from an array or arrays of microLEDs (sometimes called "μLEDs" or "uLEDs"). MicroLEDs can support high density pixels having a lateral dimension less than 100 micrometers (μm) by 100 μm. In some embodiments, microLEDs with dimensions of about 50 μm in diameter or width and smaller can be used. Such microLEDs can be used for color displays by aligning, in close proximity, microLEDs comprising red, blue and green wavelengths. In other embodiments, microLEDS can be defined on a monolithic gallium nitride (GaN) or other semiconductor substrate, formed on segmented, partially, or fully divided semiconductor substrate, or individually formed or panel assembled as groupings of microLEDs. In some embodiments, the LED array 110 can include small numbers of microLEDs positioned on substrates that are centimeter scale area or greater. In some embodiments, the LED array 110 can support microLED pixel arrays with hundreds, thousands, or millions of LEDs positioned together on centimeter scale area substrates or smaller. In some embodiments, microLEDS can include light emitting diodes sized between 30 microns and 500 microns. In some embodiments, the microLED pixel arrays can be formed from light emitting elements of various types, sizes, and layouts. In some embodiments, one- or two-dimensional matrix arrays of individually addressable light emitting diodes (LEDs) can be used. Commonly N×M arrays where N and M are respectively between two and one thousand can be used. Individual LED structures can have a square, rectangular, hexagonal, polygonal, circular, arcuate, or other surface shape. Arrays of the LED assemblies or structures can be arranged in geometrically straight rows and columns, staggered rows or columns, curving lines, or semi-random or random layouts. LED assemblies can include multiple LEDs formed as individually addressable pixel arrays are also supported. In some embodiments, radial or other non-rectangular grid arrangements of conductive lines to the LED can be used. In other embodiments, curving, winding, serpentine, and/or other suitable non-linear arrangements of electrically conductive lines to the LEDs can be used.

Figure 2:
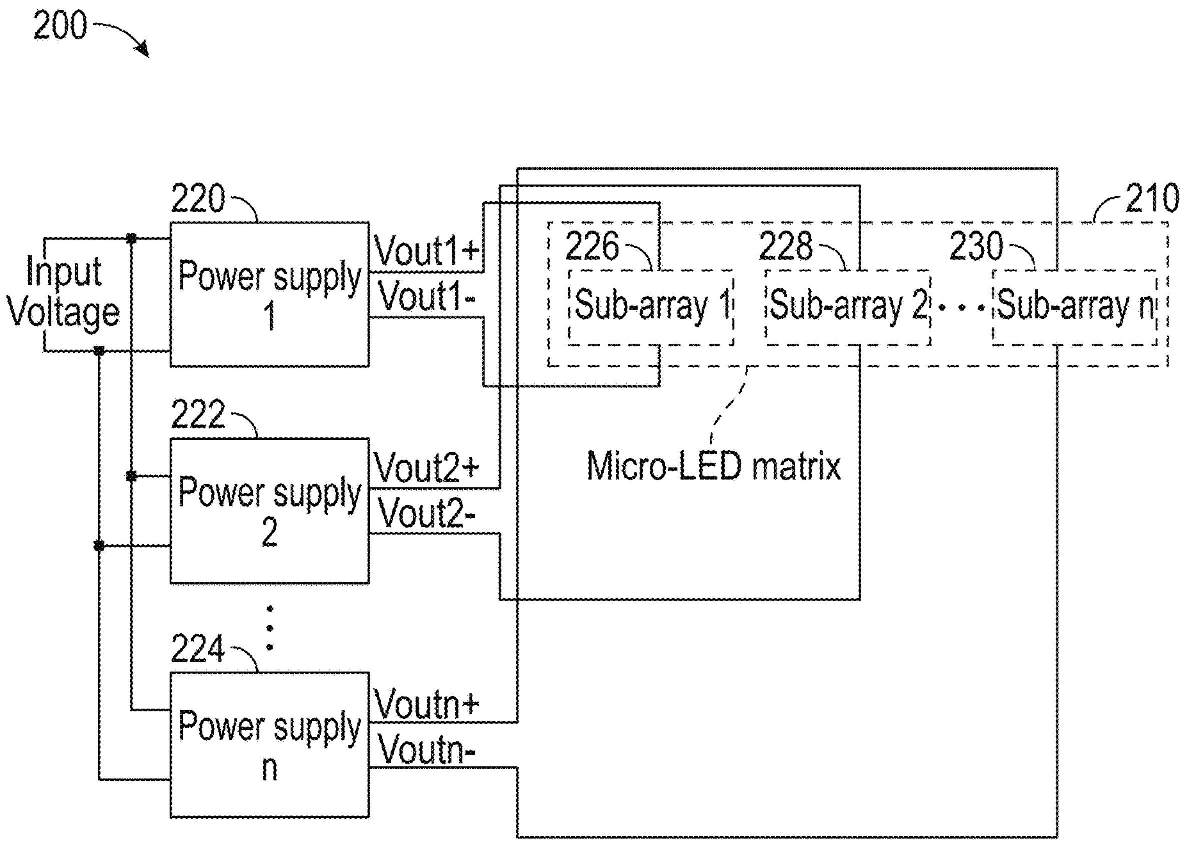
FIG. 2 illustrates embodiments including power supply to multiple sub-arrays.

FIG. 2 illustrates an embodiment 200 showing respective n power supplies 220, 222, 224 that provide independent power to respective n sub-arrays 226, 228, 230 of the overall LED array 210. Instead of using a common power supply that provides electrical power to all pixels in LED array 210 (which can, for example, be a micro-LED matrix or similar LED display/light projector), each of the power supplies 220, 222, 224 is connected to a respective sub-array n. Advantageously, because each individual power supply 220, 222, 224 is able to provide a reduced amount of power, rather than provide the total power for an entire LED array 210, the size of each power supply 220, 222, 224 is able to be much smaller than that of a single power supply for the micro-LED array 210. Additionally, the illustrated configuration in FIG. 2 makes the configuration of the power supplies 220, 222, 224 more flexible due to more choices in power components that form the power supplies 220, 222, 224 that operate at relatively lower power levels.

In some embodiments, each power supply voltage can be fixed or dynamically regulated to provide a distinct voltage based on a determined LED forward voltage to individual LED sub-arrays 226, 228, 230 in the LED array 210. The fixed power supply voltage can be calibrated and set at a factory or after deployment. Dynamically regulated power supplies can also be calibrated at a factory, or dynamically set at LED array turn-on, intermittently during operation, or continuously scheduled to make adjustments to voltage supply based on direct measurements of power usage or simulations or estimates of power to be used by each sub-array 226, 228, 230. For example, in an instance in which energy efficiency is more important, continuous scheduling can be used. If energy efficiency is less important, fewer measurements of power or adjustments to voltage supply can be used. This allows, for example, sub-array 1 to be powered using a voltage efficiently matched to a LED forward voltage used, which can be different than that used by sub-array 2. The supply voltage can be set based on a maximum, average, or the like, of forward voltages of LEDs in the sub-array 226, 228, 230.

Figure 3A:
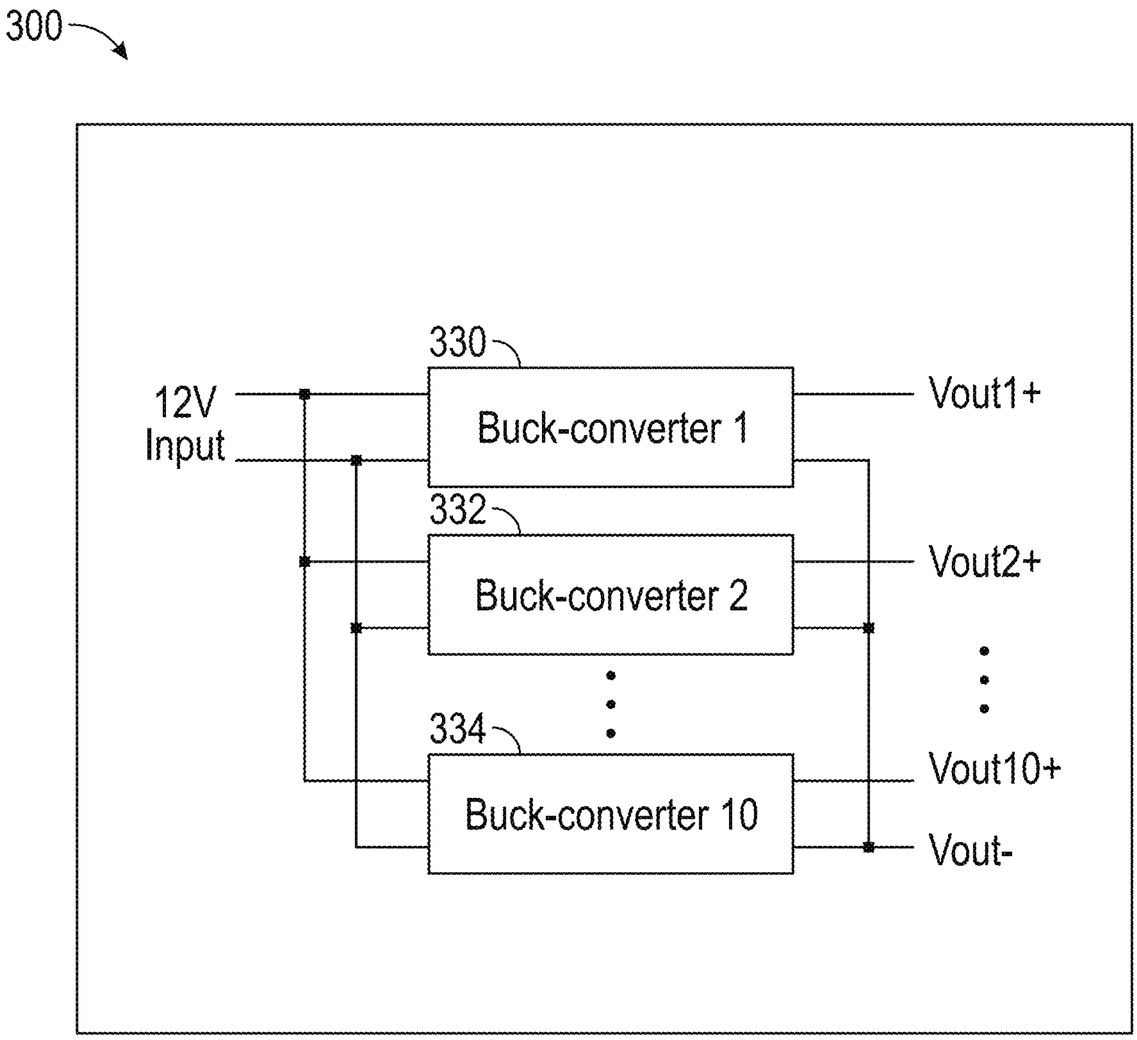
FIGS. 3A and 3B illustrate an embodiment of a power supply using multiple buck converters to supply power to LEDs in an array.
Figure 3B:
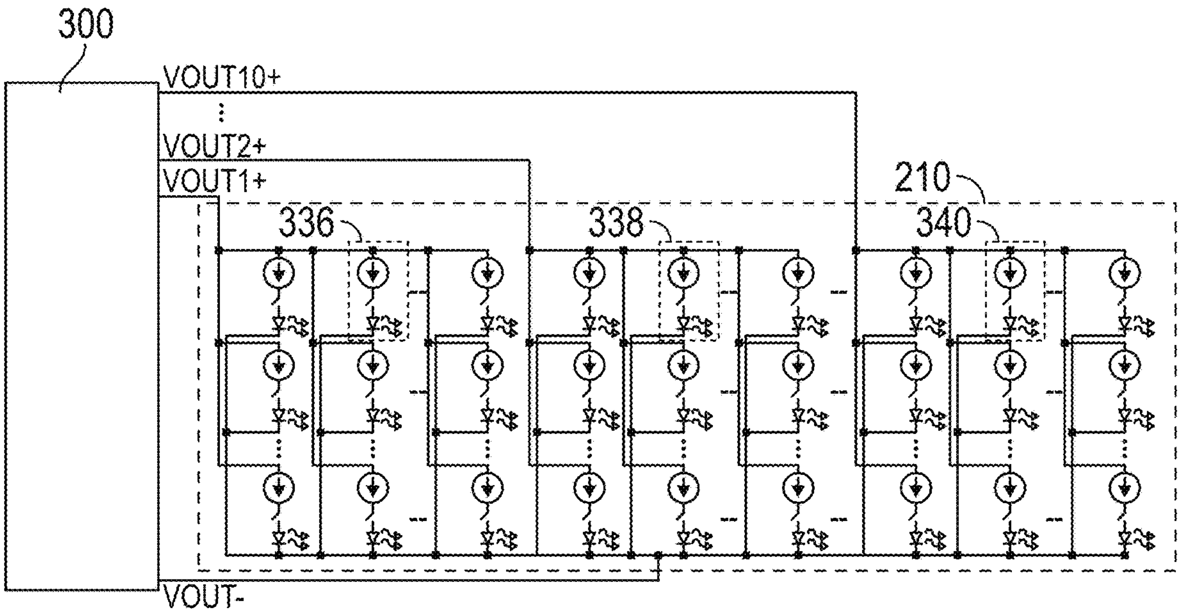

FIGS. 3A and 3B together illustrate an embodiment of a power supply system 300 using multiple buck converters 330, 332, 334. The buck converters 330, 332, 334 can be provide a digitally controlled output voltage. The output voltage can be set by a controller 120 (see FIG. 1) based on a maximum forward voltage of a sub-array to which the buck converter 330, 332, 334 supplies power. Each of the buck converters 330, 332, 334 can thus provide a different positive power. The buck converters 330, 332, 334 illustrated include output ports, one of which supplies a negative voltage that is common to all of the buck converters 330, 332, 334 and the other of which supplies a positive voltage that is dependent on an electrical characteristic of the sub-array.

The power supply system 300 is connected to an LED array 210 (shown in at least FIG. 3B) that partially represents an LED array including n (e.g., 10,000) pixels 336, 338, 340 and that is divided into m (e.g., ten (10)) segments of 1000 pixels. Segments can have different numbers of pixels. Each of the pixels 336, 338, 340 are part of different segments of pixels of the array 210. Each segment is powered by a separate positive voltage from the system 300. In FIGS. 3A and 3B, there are m power supplies 220, 222, 224 that include respective buck converters 330, 332, 334 based that convert a 12V input voltage to a 3.5V output voltage from Vout1+ to Vout10+. The power supplies 220, 222, 224 share a common ground, Vout−. In FIG. 3B, all micro-LED sub-arrays share the common ground Vout−, while each sub-array is connected to its own positive power supply voltage from Vout1+ to Vout10+. Inside each segment, all pixels are connected in parallel and share the same power supply 220, 222, 224. Each pixel includes a current source, a pulse width modulation (PWM) switch and a micro-LED.

Figure 4:
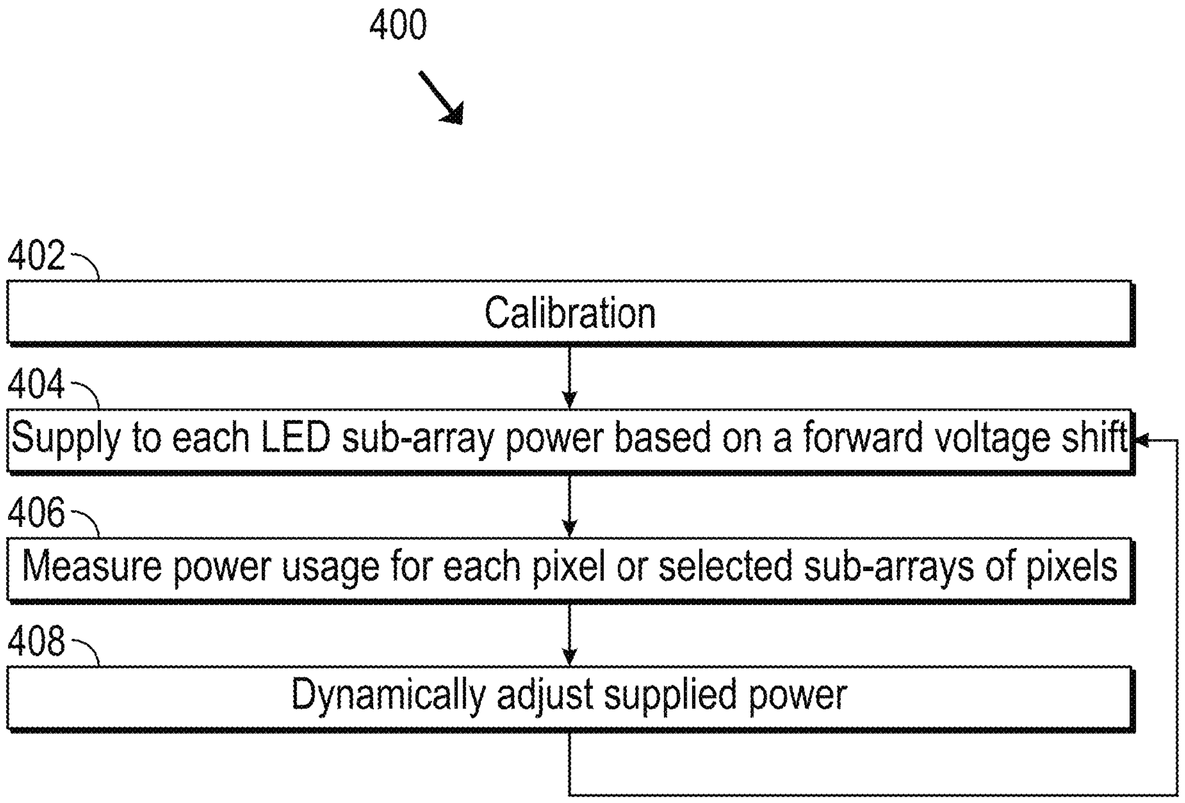
FIG. 4 illustrates operation of an embodiment of microLED control module that supports multiple dynamically regulated power supplies.

FIG. 4 illustrates operation 400 of an embodiment of microLED control module (e.g., local control module 502 or the command-and-control module 616) that supports multiple, dynamically regulated power supplies 220, 222, 224. In operation 402, calibration is performed, such as at a factory, at LED array turn-on, intermittently during operation, or continuously scheduled. In some embodiments, calibration includes determining operational dependency based on at least one of LED design, manufacturing factors, or supplied current. Based at least in part on calibration measurements, in operation 404 each LED sub-array power supply 220, 222, 224 supplies power suitable for efficient forward voltage shift matching. In operation 406, power usage is measured for each pixel or selected sub-array of pixels. Measurement can be one-time, set intermittently during operation, or continuously scheduled. In operation 408, a dynamically adjusted electrical power is supplied, and the process can be repeated as desired. The power can be adjusted based on the power usage measured at operation 406.

Figure 5:
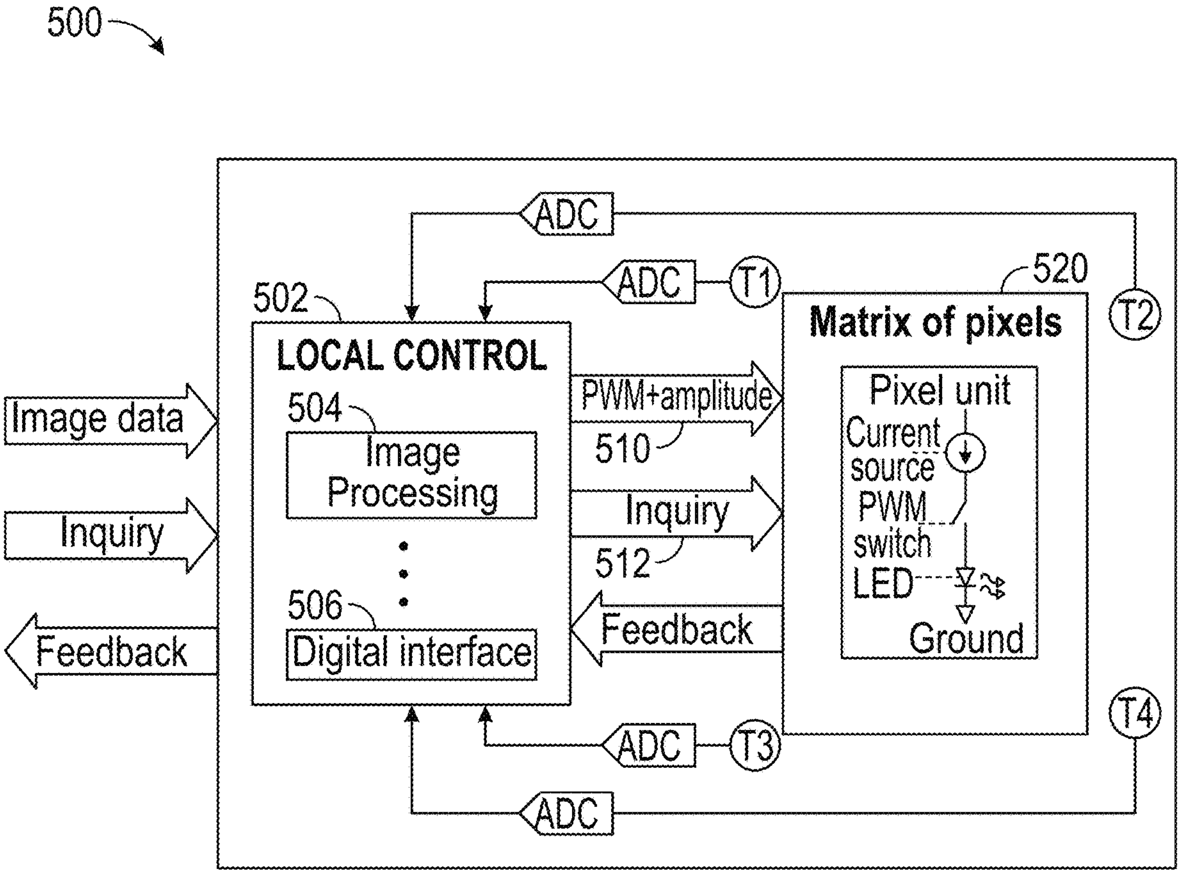
FIG. 5 illustrates an example of a system having a microLED control module that supports multiple power supplies.

FIG. 5 illustrates one example of a lighting matrix control system 500 having a suitable lighting logic and control module and/or pulse width modulation module to permit separately controlled and adjusted pixel intensity by setting appropriate ramp times and pulse width. Addressable LED pixel activation can be used to provide patterned lighting, to reduce color or intensity variations, and to provide various pixel diagnostic functionality. As discussed with respect to FIG. 1, a micro-LED array such as illustrated in FIG. 5 can contain arrays of thousands to millions of microscopic LED pixels that actively emit light and are individually controlled. To emit light in a pattern or sequence that results in display of an image, the current levels of the micro-LED pixels at different locations on an array are adjusted individually according to a specific image. This can involve a pulse width modulation (PWM), which turns on and off the pixels at a certain frequency. During PWM operation, the average direct current (DC) through a pixel is the product of the current amplitude and the PWM duty cycle, which is the ratio between the conduction time and the period or cycle time.

Processing modules that facilitate efficient usage of the system 500 are illustrated in FIG. 5. The system 500 includes a control module 502 able to implement pixel or group pixel level control of amplitude and duty cycle for a micro-LED array. In some embodiments the system further includes an image processing module 504 to generate, process, or transmit an image, and digital control interfaces 506 such as inter-integrated circuit ($I^2C$) ($I^2C$ is a synchronous, multi-leader, multi-follower, packet switched, single-ended, serial communication bus) that are configured to transmit needed control data or instructions. The digital control interfaces 506 and control module 502 may include the system microcontroller and any type of wired or wireless module configured to receive a control input from an external device. By way of example, a wireless module may include blue tooth, Zigbee, Z-wave, mesh, WiFi, near field communication (NFC) and/or peer to peer modules may be used. The microcontroller may be any type of special purpose computer or processor that may be embedded in an LED lighting system and configured or configurable to receive inputs from the wired or wireless module or other modules in the LED system and provide control signals to other modules based thereon. Algorithms implemented by the microcontroller or other suitable control module 502 may be implemented in a computer program, software, or firmware incorporated in a non-transitory computer-readable storage medium for execution by the special purpose processor. Examples of non-transitory computer-readable storage mediums include a read only memory (ROM), a random-access memory (RAM), a register, cache memory, and semiconductor memory devices. The memory may be included as part of the microcontroller or may be implemented elsewhere, either on or off a printed circuit or electronics board The term module, as used herein, may refer to electrical and/or electronic components disposed on individual circuit boards that may be soldered to one or more electronics boards. The term module may, however, also refer to electrical and/or electronic components that provide similar functionality, but which may be individually soldered to one or more circuit boards in a same region or in different regions.

As previously noted, local control module 502 can further include the image processing module 504 and the digital control interfaces 506 such as $I^2C$, serial peripheral interface (SPI), controller area network (CAN), universal asynchronous receiver/transmitter (UART), universal serial bus (USB), or the like. In some embodiments, an image processing computation may be done by the control module 502 through directly generating a modulated image. Alternatively, a standard image file can be processed or otherwise converted to provide modulation to match the image. Image data that mainly contains PWM duty cycle values can be processed for all pixels in image processing module 504. Since amplitude is a fixed value or rarely changed value, amplitude related commands can be given separately through a digital interface, such as one mentioned elsewhere herein. The control module 502 interprets all the digital data, which is then used by a PWM generator to generate PWM signals 510 for pixels, and by digital-to-analog converter (DAC) signals 512 to generate the control signals for obtaining the required current source amplitude. In some embodiments, discrete temperature sensors (T1-T4) can be used for temperature monitoring that can supplement or provide calibration for the described pixel level temperature monitoring system and method. In one embodiment, the pixel matrix 520 in FIG. 5 can include m pixels that can support pixel level temperature measurements. In one example embodiment the pixels are connected to multiple current sources and a PWM switch such as previously described with respect to FIG. 4

Figure 6:
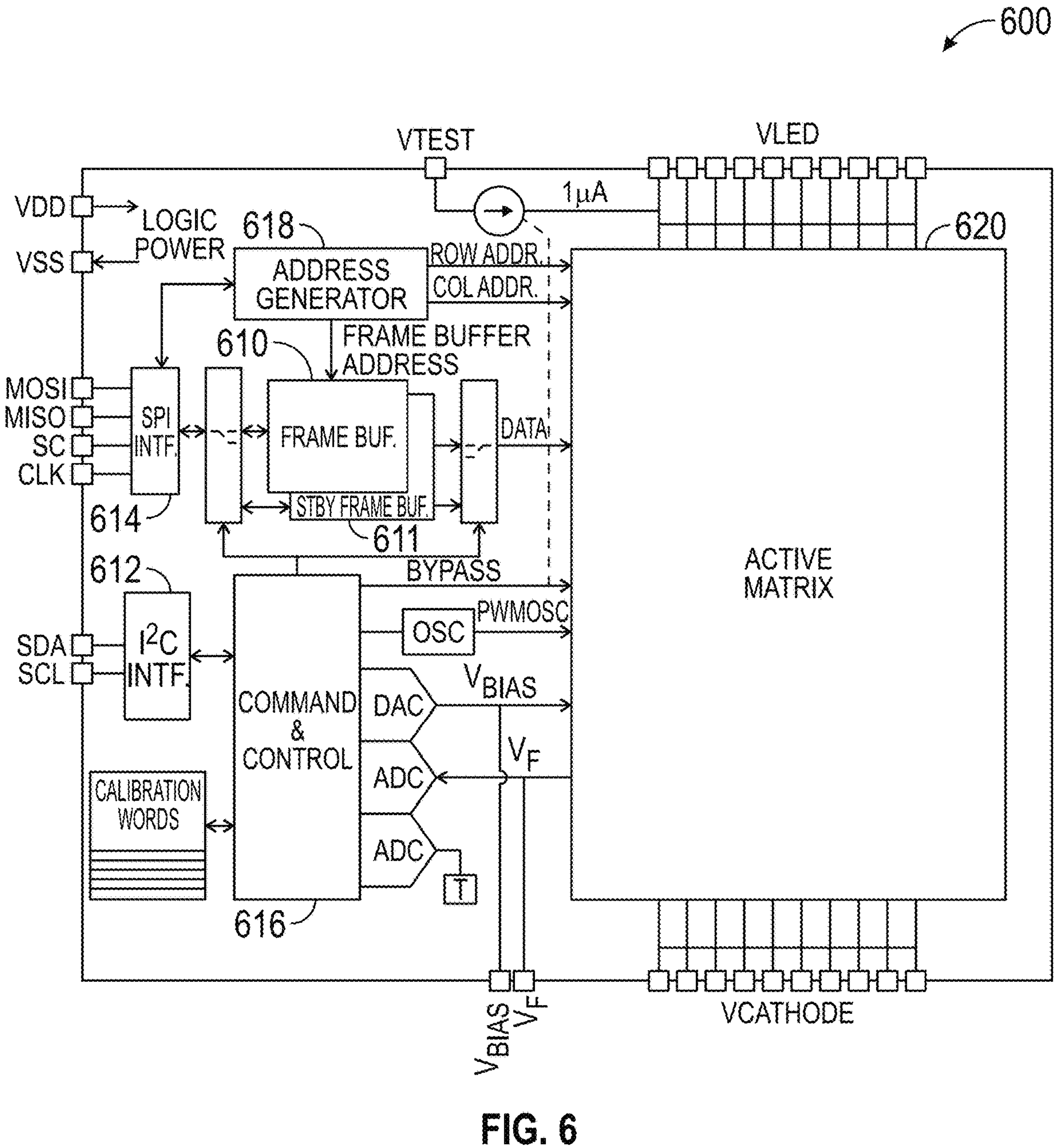
FIG. 6 illustrates a detailed chip level implementation of a system having a microLED control module that supports multiple power supplies.

FIG. 6 illustrates in more detail one chip level implementation of a system 600 supporting functionality such as discussed with respect to FIGS. 3A-B, 4 and 5. The system 600 includes a command-and-control module 616 able to calibrate and provide distinct power levels to LED sub-arrays, control monitoring and control as well as implement pixel or group pixel level control of amplitude and duty cycle for circuitry. In some embodiments, the system 600 further includes a frame buffer 610 for holding generated or processed images that can be supplied to an active LED matrix 620. Other modules can include digital control interfaces such as $I^2C$ serial bus 612 or SPI 614 that are configured to transmit needed control data or instructions.

In operation, system 600 can accept image or other data from a vehicle or other source that arrives via the SPI 614. Successive images or video data can be stored in an image frame buffer 610. If no image data is available, one or more standby images held in a standby image buffer 611 can be directed to the image frame buffer 610. Such standby images can include, for example, an intensity and spatial pattern consistent with legally allowed low beam headlamp radiation patterns of a vehicle, or default light radiation patterns for architectural lighting or displays.

In operation, pixels in the images are used to define response of corresponding LED pixels in the active, with intensity and spatial modulation of LED pixels being based on the image(s). To reduce data rate issues, groups of pixels (e.g., 5×5 blocks) can be controlled as single blocks in some embodiments. In some embodiments, high speed and high data rate operation is supported, with pixel values from successive images able to be loaded as successive frames in an image sequence at a rate between 30 Hz and 100 Hz, with 60 Hz being typical. PWM can be used to control each pixel to emit light in a pattern and with an intensity at least partially dependent on the image held in the image frame buffer 610.

In some embodiments, the system 600 can receive logic power via Vdd and Vss pins. An active matrix receives power for LED array control by multiple VLED and VCathode pins. The SPI 614 can provide full duplex mode communication using a leader-follower architecture with a single leader. The leader device originates the frame for reading and writing. Multiple follower devices are supported through selection with individual slave select (SS) lines. Input pins can include a Leader Output Follower Input (MOSI), a Leader Input Follower Output (MISO), a chip select (SC), and clock (CLK), all connected to the SPI 614. The SPI 614 connects to an address generator, frame buffer, and a standby frame buffer. Pixels can have parameters set and signals or power modified (e.g., by power gating before input to the frame buffer, or after output from the frame buffer via pulse width modulation or power gating) by a command-and-control module. The SPI 614 can be connected to an address generation module 618 that in turn provides row and address information to the active matrix 620. The address generator module 618 in turn can provide the frame buffer address to the frame buffer 610.

In some embodiments, the command-and-control module 616 can be externally controlled via an $I^2C$ serial bus 612. A clock (SCL) pin and data (SDA) pin with 7-bit addressing can be supported. The command-and-control module 616 can include a DAC and two analog to digital converters (ADC). These are respectively used to set $V_{bias}$ for a connected active matrix, help determine maximum $V_f$, determine system temperature, or set power supplied respective LED pixel sub-arrays. Also connected are an oscillator (OSC) to set the pulse width modulation oscillation (PWMOSC) frequency for the active matrix 620. In one embodiment, a bypass line is also present to allow address of individual pixels or pixel blocks in the active matrix for diagnostic, calibration, or testing purposes. The active matrix 620 can be further supported by row and column select that is used to address individual pixels, which are supplied with a data line, a bypass line, a PWMOSC line, a Vbias line, and a Vf line.

As will be understood, in some embodiments the described circuitry and active LED matrix 620 can be packaged and optionally include a submount or printed circuit board connected for powering and controlling light production by the semiconductor LED. In certain embodiments, the printed circuit board can also include electrical vias, heat sinks, ground planes, electrical traces, and flip chip or other mounting systems. The submount or printed circuit board may be formed of any suitable material, such as ceramic, silicon, aluminum, etc. If the submount material is conductive, an insulating layer is formed over the substrate material, and the metal electrode pattern is formed over the insulating layer. The submount can act as a mechanical support, providing an electrical interface between electrodes on the LED and a power supply, and also provide heat sinking.

More generally, light emitting active matrix pixel arrays such as discussed herein may support applications that benefit from fine-grained intensity, spatial, and temporal control of light distribution. This may include, but is not limited to, precise spatial patterning of emitted light from pixel blocks or individual pixels. Depending on the application, emitted light may be spectrally distinct, adaptive over time, and/or environmentally responsive. The light emitting pixel arrays may provide pre-programmed light distribution in various intensity, spatial, or temporal patterns. The emitted light may be based at least in part on received sensor data and may be used for optical wireless communications. Associated optics may be distinct at a pixel, pixel block, or device level. An example light emitting pixel array may include a device having a commonly controlled central block of high intensity pixels with an associated common optic, whereas edge pixels may have individual optics. Common applications supported by light emitting pixel arrays include video lighting, automotive headlights, architectural and area illumination, street lighting, and informational displays.

Light emitting matrix pixel arrays may be used to selectively and adaptively illuminate buildings or areas for improved visual display or to reduce lighting costs. In addition, light emitting pixel arrays may be used to project media facades for decorative motion or video effects. In conjunction with tracking sensors and/or cameras, selective illumination of areas around pedestrians may be possible. Spectrally distinct pixels may be used to adjust the color temperature of lighting, as well as support wavelength specific horticultural illumination.

Street lighting is an application that may greatly benefit from use of light emitting pixel arrays. A single type of light emitting array may be used to mimic various street light types, allowing, for example, switching between a Type I linear streetlight and a Type IV semicircular streetlight by appropriate activation or deactivation of selected pixels. In addition, street lighting costs may be lowered by adjusting light beam intensity or distribution according to environmental conditions or time of use. For example, light intensity and area of distribution may be reduced when pedestrians are not present. If pixels of the light emitting pixel array are spectrally distinct, the color temperature of the light may be adjusted according to respective daylight, twilight, or night conditions.

Light emitting arrays are also well suited for supporting applications requiring direct or projected displays. For example, warning, emergency, or informational signs may all be displayed or projected using light emitting arrays. This allows, for example, color changing or flashing exit signs to be projected. If a light emitting array is composed of a large number of pixels, textual or numerical information may be presented. Directional arrows or similar indicators may also be provided.

Vehicle headlamps are a light emitting array application that requires large pixel numbers and a high data refresh rate. Automotive headlights that actively illuminate only selected sections of a roadway can used to reduce problems associated with glare or dazzling of oncoming drivers. Using infrared cameras as sensors, light emitting pixel arrays activate only those pixels needed to illuminate the roadway, while deactivating pixels that may dazzle pedestrians or drivers of oncoming vehicles. In addition, off-road pedestrians, animals, or signs may be selectively illuminated to improve driver environmental awareness. If pixels of the light emitting pixel array are spectrally distinct, the color temperature of the light may be adjusted according to respective daylight, twilight, or night conditions. Some pixels may be used for optical wireless vehicle to vehicle communication.

ADDITIONAL NOTES AND EXAMPLES

Example 1 can include a power supply system for a light emitting diode (LED) pixel array, comprising at least two power supplies respectively configured to provide adjustable electrical power to respective LED sub-arrays in the LED pixel array; and a controller for the at least two power supplies, the controller configured to measure forward voltage of respective LED pixels of the LED sub-array, and adjust the electrical power provided by the at least two power supplies based on measured forward voltage of respective LED pixels of the LED sub-arrays.

In Example 2, Example 1 can further include, wherein the LED pixel array comprises a microLED pixel array.

In Example 3, at least one of Examples 1-2 can further include, wherein settings of the at least two power supplies are factory set.

In Example 4, at least one of Examples 1-3 can further include, wherein settings of the at least two power supplies are dynamically set.

In Example 5, at least one of Examples 1~4 can further include, wherein the at least two power supplies include buck converters.

In Example 6, at least one of Examples 1-5 can further include, wherein the at least two power supplies include multiple ports, a first port of the multiple ports that supplies independent, positive power and a second port of the multiple ports that supplies a common ground voltage to all sub-arrays of the LED pixel array.

In Example 7, at least one of Examples 1-6 can further include, wherein the at least two power supplies are each connectable in parallel to respective sub-arrays in the LED pixel array.

Example 8 includes a micro light emitting diode (LED) pixel array system, comprising a plurality of microLED pixels arranged into independently powered sub-arrays, at least two power supplies respectively connected to a sub-array of the sub-arrays and configured to provide adjustable electrical power to the sub-array, and a controller for the at least two power supplies, the controller configured to measure an electrical property of respective LED pixels of the sub-array, and adjust electrical power provided by the at least two power supplies based on the measured electrical properties.

In Example 9, Example 8 can further include, wherein each pixel in the plurality of microLED pixels is independently addressable.

In Example 10, at least one of Examples 8-9 can further include, wherein settings of the at least two power supplies are factory set or set dynamically after deployment.

In Example 11, at least one of Examples 8-10 can further include, wherein measured electrical properties include forward voltage of pixels of the LED sub-arrays.

In Example 12, at least one of Examples 8-11 can further include, wherein the at least two power supplies include buck converters.

In Example 13, at least one of Examples 8-12 can further include, wherein the at least two power supplies provide an independent positive power supply voltage and provide a shared common ground voltage.

In Example 14, at least one of Examples 8-13 can further include, wherein the at least two power supplies are respectively electrically connected in parallel to each other and each of the at least two power supplies are electrically connected to a respective sub-array of the respective sub-arrays in the LED pixel array.

Example 15 includes a control method for a light emitting diode (LED) array, the method comprising providing a plurality of microLED pixels arranged to include at least two independently electrically powered, sub-arrays, each of the sub-arrays including distinct microLED pixels of the plurality of microLED pixels, supplying, to each sub-array, power based on forward voltage shift matching, measuring power usage for at least some of the plurality of microLED pixels, and dynamically adjusting electrical power supplied to the independently powered sub-arrays based on the measured power and the forward voltage shift.

In Example 16, Example 15 can further include, wherein supplying the power includes supplying an independent positive supply and a shared common ground.

In Example 17, at least one of Examples 15-16 can further include, wherein each pixel of the plurality of microLED pixels includes a current source, a pulse width modulation switch, and an LED connected in series.

In Example 18, at least one of Examples 15-17 can further include setting, at a manufacturing facility, settings of at least two power supplies that supply the power.

In Example 19, at least one of Examples 15-18 can further include independently altering operation of each pixel in the plurality of microLED pixels.

In Example 20, at least one of Examples 15-19 can further include, wherein at least two power supplies that supply the power each include buck converters.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein. In those embodiments supporting software-controlled hardware, the methods, procedures, and implementations described herein may be realized in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

The invention claimed is:

1. A power supply system for a light emitting diode (LED) pixel array having LED pixel sub-arrays of LEDs pixels, comprising:

at least two power supplies each configured to provide adjustable electrical power to a different LED pixel sub-array of the LED pixel sub-arrays, each of the LED pixels including a current source and an LED; and a controller for the at least two power supplies, the controller configured to:

measure forward voltages of the LED pixels of each of the LED pixel sub-arrays, and adjust the electrical power provided by the at least two power supplies based on the measured forward voltages of the LED pixels of the LED pixel sub-arrays.

2. The power supply for an LED pixel array of claim 1, wherein the LED pixel array comprises a microLED pixel array.

3. The power supply system for an LED pixel array of claim 1, wherein settings of the at least two power supplies are factory set.

4. The power supply system for an LED pixel array of claim 1, wherein settings of the at least two power supplies are dynamically set.

5. The power supply system for an LED pixel array of claim 1, wherein the at least two power supplies include buck converters.

6. The power supply system for an LED pixel array of claim 1, wherein the at least two power supplies include multiple ports, a first port of the multiple ports that supplies independent, positive power and a second port of the multiple ports that supplies a common ground voltage to all sub-arrays of the LED pixel array.

7. The power supply system for an LED pixel array of claim 1, wherein the at least two power supplies are each connectable in parallel to respective sub-arrays in the LED pixel array.

8. A micro light emitting diode (LED) pixel array system, comprising:

a plurality of microLED pixels arranged into independently powered LED pixel sub-arrays, each of the microLED pixels including a current source and an LED;

at least two power supplies each connected to a different LED pixel sub-array of the LED pixel sub-arrays and configured to provide adjustable electrical power to the LED pixel sub-array; and a controller for the at least two power supplies, the controller configured to:

measure an electrical property of each LED pixel of each of the LED pixel sub-arrays, and adjust electrical power provided by the at least two power supplies based on the measured electrical property of the LED pixels of each of the LED pixel sub-arrays.

9. The microLED pixel array system of claim 8, wherein each pixel in the plurality of microLED pixels is independently addressable.

10. The microLED pixel array system of claim 8, wherein settings of the at least two power supplies are factory set or set dynamically after deployment.

11. The microLED pixel array system of claim 8, wherein measured electrical properties include forward voltage of pixels of the LED sub-arrays.

12. The microLED pixel array system of claim 8, wherein the at least two power supplies include buck converters.

13. The microLED pixel array system of claim 8, wherein the at least two power supplies provide an independent positive power supply voltage and provide a shared common ground voltage.

14. The microLED pixel array system of claim 8, wherein the at least two power supplies are respectively electrically connected in parallel to each other and each of the at least two power supplies are electrically connected to a respective sub-array of the respective sub-arrays in the LED pixel array.

15. A control method for a light emitting diode (LED) array, comprising:

providing a plurality of microLED pixels arranged to include at least two independently electrically powered microLED pixel sub-arrays, each of the microLED pixel sub-arrays including different microLED pixels, each of the microLED pixels including a current source and an LED;

supplying, to each microLED pixel sub-array and from a different dedicated power supply, power based on forward voltage shift matching, measuring power usage and forward voltage shift for at least some of the plurality of microLED pixels of each of the microLED pixel sub-arrays; and dynamically adjusting the power supplied to the microLED pixel sub-arrays based on the measured power and the forward voltage shift.

16. The control method of claim 15, wherein supplying the power includes supplying an independent positive supply and a shared common ground.

17. The control method of claim 15, wherein each pixel of the plurality of microLED pixels includes a current source, a pulse width modulation switch, and an LED connected in series.

18. The control method of claim 15, further comprising setting, at a manufacturing facility, settings of at least two power supplies that supply the power.

19. The control method of claim 15, further comprising independently altering operation of each pixel in the plurality of microLED pixels.

20. The control method of claim 15, wherein at least two power supplies that supply the power each include buck converters.

* * * * *